(12) United States Patent
Grivna et al.

(10) Patent No.: US 9,007,342 B2
(45) Date of Patent: Apr. 14, 2015

(54) DYNAMIC MODE SWITCHING FOR FAST TOUCH RESPONSE

(71) Applicant: Cypress Semiconductor Corporation, San Jose, CA (US)

(72) Inventors: Edward Grivna, Brooklyn Park, MN (US); Jason Baumbach, Campbell, CA (US); David Bordui, Lake Mary, FL (US); Weibiao Zhang, Shanghai (CN); MingChan Chen, Hsinchu (TW); Tao Peng, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/950,672

(22) Filed: Jul. 25, 2013

(65) Prior Publication Data

US 2013/0307823 A1   Nov. 21, 2013

Related U.S. Application Data

(63) Continuation of application No. 12/844,798, filed on Jul. 27, 2010.

(60) Provisional application No. 61/229,236, filed on Jul. 28, 2009.

(51) Int. Cl.
G06F 3/041   (2006.01)
G06F 3/044   (2006.01)

(52) U.S. Cl.
CPC .............. *G06F 3/0416* (2013.01); *G06F 3/044* (2013.01); *G06F 2203/04808* (2013.01)

(58) Field of Classification Search
USPC .......................................... 345/156, 173–184
See application file for complete search history.

(56) References Cited

U.S. PATENT DOCUMENTS

| | | | |
|---|---|---|---|
| 3,660,801 | A | 5/1972 | Paulfus |
| 3,921,167 | A | 11/1975 | Fox |
| 4,686,332 | A | 8/1987 | Greanias et al. |
| 4,918,262 | A | 4/1990 | Flowers et al. |
| 4,935,728 | A | 6/1990 | Kley |
| 5,239,140 | A | 8/1993 | Kuroda et al. |
| 5,374,787 | A | 12/1994 | Miller et al. |

(Continued)

FOREIGN PATENT DOCUMENTS

| | | |
|---|---|---|
| WO | 0203368 A1 | 1/2002 |
| WO | 2011005977 A2 | 1/2011 |
| WO | 2012177571 A | 12/2012 |

OTHER PUBLICATIONS

Application No. PCT/US08/69108 "Method for Improving Scan Time and Sensitivity in Touch Sensitive User Interface Device," Filed on Jul. 2, 2008; 44 pages.

(Continued)

*Primary Examiner* — Christopher E Leiby
(74) *Attorney, Agent, or Firm* — Lowenstein Sandler LLP

(57) ABSTRACT

A method of operating a touch-sensing surface may include performing a first scan of a first set of electrodes of a touch-sensing surface, determining a presence of at least one conductive object proximate to the touch-sensing surface, in response to determining the presence of the at least one conductive object, performing a second scan of a second set of electrodes of the touch-sensing surface, and repeating the performing the second scan until the at least one conductive object is no longer proximate to the touch-sensing surface.

18 Claims, 8 Drawing Sheets

(56) References Cited

U.S. PATENT DOCUMENTS

| | | | |
|---|---|---|---|
| 5,386,584 A | 1/1995 | Verstegen et al. | |
| 5,412,387 A | 5/1995 | Vincelette et al. | |
| 5,495,077 A * | 2/1996 | Miller et al. | 178/18.06 |
| 5,642,134 A | 6/1997 | Ikeda | |
| 5,648,642 A | 7/1997 | Miller et al. | |
| 5,825,352 A | 10/1998 | Bisset et al. | |
| 5,841,078 A | 11/1998 | Miller et al. | |
| 5,872,561 A * | 2/1999 | Figie et al. | 345/168 |
| 5,920,309 A | 7/1999 | Bisset et al. | |
| 6,292,173 B1 | 9/2001 | Rambaldi et al. | |
| 6,396,484 B1 | 5/2002 | Adler et al. | |
| 6,762,752 B2 | 7/2004 | Perski et al. | |
| 7,019,672 B2 | 3/2006 | Ely | |
| 7,036,096 B1 | 4/2006 | Sarkar et al. | |
| 7,100,430 B2 | 9/2006 | Samsavar et al. | |
| 7,301,350 B2 | 11/2007 | Hargreaves et al. | |
| 7,375,535 B1 | 5/2008 | Kutz et al. | |
| 7,406,393 B2 | 7/2008 | Ely et al. | |
| 7,428,191 B1 * | 9/2008 | Klein | 368/82 |
| 7,663,607 B2 | 2/2010 | Hotelling et al. | |
| 7,982,723 B2 * | 7/2011 | Ningrat | 345/174 |
| 8,120,591 B2 | 2/2012 | Krah et al. | |
| 8,305,357 B2 | 11/2012 | Liao et al. | |
| 8,315,832 B1 | 11/2012 | Seguine | |
| 8,350,826 B2 | 1/2013 | Watanabe | |
| 8,436,831 B2 | 5/2013 | Wei et al. | |
| 8,462,127 B2 | 6/2013 | Chiu et al. | |
| 2002/0015024 A1 | 2/2002 | Westerman et al. | |
| 2003/0058053 A1 | 3/2003 | Jeon et al. | |
| 2003/0161278 A1 | 8/2003 | Igura | |
| 2003/0184065 A1 | 10/2003 | Breed et al. | |
| 2003/0209893 A1 | 11/2003 | Breed et al. | |
| 2004/0039298 A1 | 2/2004 | Abreu | |
| 2004/0047110 A1 | 3/2004 | Friederich et al. | |
| 2004/0129478 A1 | 7/2004 | Breed et al. | |
| 2004/0173028 A1 | 9/2004 | Rix | |
| 2004/0209591 A1 | 10/2004 | Martin et al. | |
| 2005/0068044 A1 | 3/2005 | Peine et al. | |
| 2005/0129292 A1 | 6/2005 | Morgeneier et al. | |
| 2005/0134292 A1 | 6/2005 | Knoedgen | |
| 2006/0012580 A1 | 1/2006 | Perski et al. | |
| 2006/0012581 A1 | 1/2006 | Haim et al. | |
| 2006/0161871 A1 | 7/2006 | Hotelling et al. | |
| 2006/0192690 A1 | 8/2006 | Philipp | |
| 2006/0197752 A1 | 9/2006 | Hurst et al. | |
| 2006/0219692 A1 | 10/2006 | Unsworth | |
| 2006/0256090 A1 | 11/2006 | Huppi | |
| 2006/0273804 A1 | 12/2006 | Delorme et al. | |
| 2007/0008299 A1 | 1/2007 | Hristov | |
| 2007/0046299 A1 | 3/2007 | Hargreaves et al. | |
| 2007/0121959 A1 | 5/2007 | Philipp | |
| 2007/0143667 A1 | 6/2007 | Deaton et al. | |
| 2007/0152977 A1 | 7/2007 | Ng et al. | |
| 2007/0182718 A1 | 8/2007 | Schoener et al. | |
| 2007/0188518 A1 | 8/2007 | Vale | |
| 2007/0229468 A1 | 10/2007 | Peng et al. | |
| 2007/0229470 A1 | 10/2007 | Snyder et al. | |
| 2007/0235231 A1 | 10/2007 | Loomis et al. | |
| 2007/0273659 A1 | 11/2007 | Xiaoping et al. | |
| 2008/0007533 A1 | 1/2008 | Hotelling | |
| 2008/0024455 A1 | 1/2008 | Lee et al. | |
| 2008/0048997 A1 * | 2/2008 | Gillespie et al. | 345/174 |
| 2008/0062148 A1 | 3/2008 | Hotelling et al. | |
| 2008/0072192 A1 | 3/2008 | Lenahan | |
| 2008/0079699 A1 | 4/2008 | Mackey | |
| 2008/0150906 A1 * | 6/2008 | Grivna | 345/173 |
| 2008/0158177 A1 | 7/2008 | Wilson et al. | |
| 2008/0158180 A1 | 7/2008 | Krah et al. | |
| 2008/0180399 A1 | 7/2008 | Cheng | |
| 2008/0246723 A1 | 10/2008 | Baumbach | |
| 2008/0277171 A1 | 11/2008 | Wright | |
| 2008/0309623 A1 | 12/2008 | Hotelling et al. | |
| 2008/0309634 A1 | 12/2008 | Hotelling et al. | |
| 2009/0009485 A1 * | 1/2009 | Bytheway | 345/174 |
| 2009/0096757 A1 * | 4/2009 | Hotelling et al. | 345/173 |
| 2009/0128516 A1 * | 5/2009 | Rimon et al. | 345/174 |
| 2009/0160787 A1 * | 6/2009 | Westerman et al. | 345/173 |
| 2009/0273579 A1 | 11/2009 | Zachut et al. | |
| 2009/0284495 A1 * | 11/2009 | Geaghan et al. | 345/174 |
| 2009/0309851 A1 * | 12/2009 | Bernstein | 345/174 |
| 2010/0001973 A1 | 1/2010 | Hotelling et al. | |
| 2010/0006350 A1 | 1/2010 | Elias | |
| 2010/0007631 A1 * | 1/2010 | Chang | 345/174 |
| 2010/0039405 A1 | 2/2010 | Chen et al. | |
| 2010/0060608 A1 | 3/2010 | Yousefpor | |
| 2010/0073301 A1 * | 3/2010 | Yousefpor et al. | 345/173 |
| 2010/0073318 A1 | 3/2010 | Hu et al. | |
| 2010/0097328 A1 * | 4/2010 | Simmons et al. | 345/173 |
| 2010/0098257 A1 | 4/2010 | Mueller | |
| 2010/0117981 A1 * | 5/2010 | Chen et al. | 345/174 |
| 2010/0155153 A1 | 6/2010 | Zachut | |
| 2010/0292945 A1 | 11/2010 | Reynolds et al. | |
| 2010/0315375 A1 | 12/2010 | Yang | |
| 2010/0328256 A1 | 12/2010 | Harada et al. | |
| 2010/0328262 A1 | 12/2010 | Huang et al. | |
| 2011/0025629 A1 | 2/2011 | Grivna et al. | |
| 2011/0133815 A1 | 6/2011 | Caldwell et al. | |
| 2011/0234523 A1 | 9/2011 | Chang et al. | |
| 2012/0043973 A1 | 2/2012 | Kremin | |
| 2012/0105362 A1 | 5/2012 | Kremin et al. | |
| 2012/0154324 A1 | 6/2012 | Wright et al. | |
| 2012/0162124 A1 | 6/2012 | Lin | |
| 2012/0242612 A1 | 9/2012 | Chang | |
| 2012/0261199 A1 | 10/2012 | Kuo et al. | |
| 2012/0268415 A1 | 10/2012 | Konovalov et al. | |
| 2012/0280929 A1 | 11/2012 | Rimon et al. | |
| 2012/0327041 A1 | 12/2012 | Harley et al. | |
| 2012/0327042 A1 | 12/2012 | Harley et al. | |
| 2013/0049771 A1 | 2/2013 | Peng et al. | |
| 2013/0100071 A1 | 4/2013 | Wright et al. | |
| 2013/0162585 A1 | 6/2013 | Schwartz | |
| 2013/0207906 A1 | 8/2013 | Yousefpor et al. | |

OTHER PUBLICATIONS

International Search Report for International Application No. PCT/US10/43590 dated Sep. 27, 2010; 2 pages.

International Search Report for International Application No. PCT/US12/64222 dated Dec. 19, 2012; 4 pages.

USPTO Advisory Action for U.S. Appl. No. 12/167,494 dated Aug. 10, 2012; 3 pages.

USPTO Advisory Action for U.S. Appl. No. 12/844,798 dated Aug. 23, 2012; 3 pages.

USPTO Advisory Action for U.S. Appl. No. 12/844/798 dated Apr. 10, 2013, 3pages.

USPTO Advisory Action for U.S. Appl. No. 13/250,379 dated Jun. 3, 2013; 3 pages.

USPTO Advisory Action for U.S. Appl. No. 13/591,145 dated Jun. 13, 2013; 3 pages.

USPTO Final Rejection for U.S. Appl. No. 12/844,798 dated Feb. 13, 2013; 19 pages.

USPTO Final Rejection for U.S. Appl. No. 12/844,798 dated Jun. 18, 2012, 21pages.

USPTO Final Rejection for U.S. Appl. No. 13/250,379 dated Apr. 3, 2013; 19 pages.

USPTO Final Rejection for U.S. Appl. No. 13/591,145 dated Apr. 3, 2013; 17 pages.

USPTO Non Final Rejection for U.S. Appl. No. 12/844,798 dated Jul. 11, 2013; 23 pages.

USPTO Non-Final Rejection for U.S. Appl. No. 12/167,494 dated Nov. 15, 2012; 20 pages.

USPTO Non-Final Rejection for U.S. Appl. No. 12/844,798 dated Feb. 14, 2012; 18 pages.

USPTO Non-Final Rejection for U.S. Appl. No. 12/844,798 dated Oct. 10, 2012; 19 pages.

USPTO Non-Final Rejection for U.S. Appl. No. 13/250,379 dated Oct. 16, 2012; 16 pages.

USPTO Non-Final Rejection for U.S. Appl. No. 13/591,145 dated Oct. 17, 2012; 16 pages.

USPTO Notice of Allowance for U.S. Appl. No. 12/167,494 dated Apr. 12, 2013; 9 pages.

(56) References Cited

OTHER PUBLICATIONS

USPTO Notice of Allowance for U.S. Appl. No. 12/167,494 dated May 31, 2013; 16 pages.
USPTO Notice of Allowance for U.S. Appl. No. 12/167,494 dated Jun. 24, 2013; 10 pages.
Written Opinion of the International Searching Authority for International Application No. PCT/US10/43590 mailed Sep. 27, 2010; 5 pages.
Written Opinion of the International Searching Authority for International Application No. PCT/US12/64222 mailed Dec. 19, 2012; 7 pages.
U.S. Appl. No. 12/167,494: "Method for Improving Scan Time and Sensitivity in Touch Sensitive User Interface Device" Ryan D. Seguine et al., filed Jun. 3, 2008; 42 pages.
U.S. Appl. No. 13/250,379: "Predictive Touch Surface Scanning" David G. Wright et al., filed Sep. 30, 2011; 60 pages.
U.S. Appl. No. 13/360,296: "Multiplexer for a TX/RX Capacitance Sensing Panel" Edward Grivna et al., filed Jan. 27, 2012; 101 pages.
U.S. Appl. No. 13/591,145: "Predictive Touch Surface Scanning" David G. Wright et al., filed Aug. 21, 2012; 64 pages.
U.S. Appl. No. 13/664,421: "Methods and Circuits for Measuring Mutual and Self Capacitance" Andriy Maharyta et al., filed Oct. 31, 2012; 58 pages.
U.S. Appl. No. 13/720,861: "Methods and Circuits for Measuring Mutual and Self Capacitance" Andriy Maharyta et al., filed Dec. 19, 2012; 38 pages.
U.S. Appl. No. 13/741,090: "Multi-Stage Stylus Scanning," Ruslan Omelchuk, filed Jan. 14, 2013; 58 pages.
U.S. Appl. No. 13/741,145: "Multi-Stage Stylus Detection" Mykhaylo Krekhovetskyy et al., filed Jan. 14, 2013; 52 pages.
U.S. Appl. No. 13/917,528: "Capacitance to Code Converter With Sigma-Delta Modulator" Viktor Kremin, Lviv et al., filed Jun. 13, 2013; 78 pages.
U.S. Appl. No. 14/222,227: "Input/Output Multiplexer Bus" Dennis R. Seguine et al., filed Mar. 21, 2014; 32 pages.
International Search Report for International Application No. PCT/US08/69108 dated Sep. 26, 2008; 2 pages.
SIPO Office Action for Application No. 201080042141.X dated Apr. 2, 2014; 6 pages.
USPTO Advisory Action for U.S. Appl. No. 12/167,494 dated May 27, 2011; 3 pages.
USPTO Advisory Action for U.S. Appl. No. 12/844,798 dated May 9, 2013; 3 pages.
USPTO Advisory Action for U.S. Appl. No. 12/844,798 dated Dec. 30, 2013; 3 pages.
USPTO Advisory Action for U.S. Appl. No. 13/250,379 dated Dec. 2, 2013; 3 pages.
USPTO Advisory Action for U.S. Appl. No. 13/591,145 dated Jul. 9, 2013; 3 pages.
USPTO Advisory Action for U.S. Appl. No. 13/591,145 dated Dec. 6, 2013; 3 pages.
USPTO Advisory Action for U.S. Appl. No. 13/720,861 dated Sep. 18, 2013; 3 pages.
USPTO Ex Parte Quayle Action for U.S. Appl. No. 13/664,421 dated Jan. 9, 2013; 6 pages.
USPTO Final Rejection for U.S. Appl. No. 12/167,494 dated Mar. 15, 2011; 15pages.
USPTO Final Rejection for U.S. Appl. No. 12/167,494 dated Mar 30, 2012; 16pages.
USPTO Final Rejection for U.S. Appl. No. 12/844,798 dated Oct. 7, 2013; 24 pages.
USPTO Final Rejection for U.S. Appl. No. 13/250,379 dated Oct. 3, 2013; 22 pages.
USPTO Final Rejection for U.S. Appl. No. 13/591,145 dated Oct. 3, 2013; 16 pages.
USPTO Final Rejection for U.S. Appl. No. 13/720,861 dated May 14, 2013; 7 pages.
USPTO Final Rejection for U.S. Appl. No. 13/720,861 dated Aug. 2, 2013; 9 pages.
USPTO Non Final Rejection for U.S. Appl. No. 12/844,798 dated Feb. 4, 2014; 27 pages.
USPTO Non Final Rejection for U.S. Appl. No. 13/917,528 dated Nov. 15, 2013; 12 pages.
USPTO Non-Final Rejection for U.S. Appl. No. 2/167,494 dated Aug. 4, 2010; 12pages.
USPTO Non-Final Rejection for U.S. Appl. No. 12/167,494 (CD07184) dated Nov. 30, 2011; 17 pages.
USPTO Non-Final Rejection for U.S. Appl. No. 13/250,379 dated Jul. 11, 2013; 20 pages.
USPTO Non-Final Rejection for U.S. Appl. No. 13/591,145 dated Aug. 12, 2013; 16 pages.
USPTO Non-Final Rejection for U.S. Appl. No. 13/720,861 dated Mar. 11, 2013; 9 pages.
USPTO Notice of Allowance for U.S. Appl. No. 12/844,798 dated May 15, 2014; 8 pages.
USPTO Notice of Allowance for U.S. Appl. No. 12/844,798 dated Jun. 30, 2014; 8 pages.
USPTO Notice of Allowance for U.S. Appl. No. 13/250,379 dated Jan. 6, 2014; 11 pages.
USPTO Notice of Allowance for U.S. Appl. No. 13/250,379 dated Mar. 11, 2014; 11 pages.
USPTO Notice of Allowance for U.S. Appl. No. 13/591,145 dated Jan. 6, 2014; 9 pages.
USPTO Notice of Allowance for U.S. Appl. No. 3/591,145 dated Feb. 28, 2014; 8 pages.
USPTO Notice of Allowance for U.S. Appl. No. 13/664,421 dated Feb. 21, 2013; 7 pages.
USPTO Notice of Allowance for U.S. Appl. No. 13/664,421 dated Jun. 14, 2013; 9 pages.
USPTO Notice of Allowance for U.S. Appl. No. 13/664,421 dated Aug. 20, 2013; 9 pages.
USPTO Notice of Allowance for U.S. Appl. No. 13/720,861 dated Jan. 30, 2014; 8 pages.
USPTO Notice of Allowance for U.S. Appl. No. 13/720,861 dated Dec. 3, 2013; 13 pages.
USPTO Notice of Allowance for U.S. Appl. No. 13/917,528 dated Apr. 16, 2014; 8 pages.
USPTO Notice of Allowance for U.S. Appl. No. 13/917,528 dated Jul. 7, 2014; 7 pages.
Written Opinion of the International Searching Authority for International Application No. PCT/US08/69108 dated Sep. 26, 2008; 4 pages.
U.S. Appl. No. 14/325,582: "Waterproof Scanning of a Capacitance Sense Array" Michael Patrick Hills et al., filed Jul. 8, 2014; 41 pages.
International Search Report and Written Opinion of the European Patent Office Application No. 10805001.4, PCT/US2010043590 dated Apr. 10, 2014; 7 pages.
USPTO Notice of Allowance for U.S. Appl. No. 12/844,798 dated Oct. 7, 2014; 8 pages.
European Search Report for European Application No. 12186513.3 dated Jun. 3, 2014; 9 pages.
SIPO Office Action for Application No. 201080042141.X dated Oct. 28, 2014; 6 pages.
USPTO Final Rejection for U.S. Appl. No. 13/741,090 dated Jan. 22, 2015; 20 pages.
USPTO Final Rejection for U.S. Appl. No. 13/741,145 dated Jan. 7, 2015; 23 pages.
USPTO Non Final Rejection for U.S. Appl. No. 13/741,090 dated Oct. 28, 2014; 18 pages.
USPTO Non Final Rejection for U.S. Appl. No. 13/741,145 dated Oct. 29, 2014; 21 pages.
USPTO Final Rejection for U.S. Appl. No. 14/275,387 dated Jan. 12, 2015; 16 pages.
USPTO Non-Final Rejection for U.S. Appl. No. 14/275,387 dated Sep. 22, 2014; 15 pages.

* cited by examiner

DYNAMIC MODE SWITCHING FOR FAST TOUCH RESPONSE

RELATED APPLICATIONS

This application is a continuation of U.S. application Ser. No. 12/844,798, filed Jul. 27, 2010, which claims the benefit of U.S. Provisional Application No. 61/229,236, filed on Jul. 28, 2009, the entire contents of both are incorporated by reference herein.

TECHNICAL FIELD

This disclosure relates to the field of touchscreen controllers and, in particular, to decreasing response time by using different sensing modes of a touchscreen controller.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touchscreen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

Figure 1:
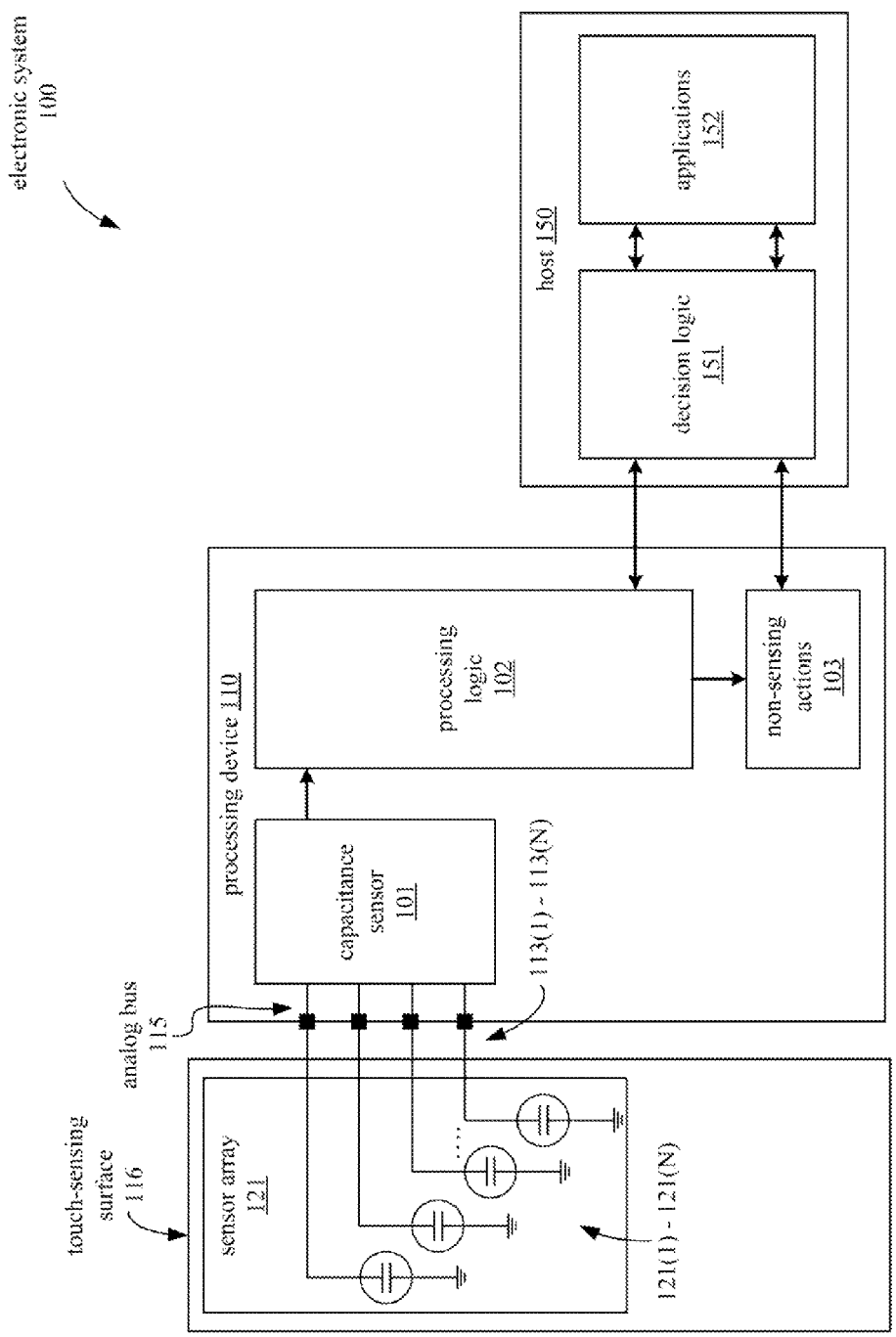
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention.

Described herein is a method and apparatus for determining a presence and location of one or more conductive objects in contact with or proximate to a touch-sensing surface. As described herein, a contact may be detected when a conductive object (e.g., a finger) physically touches the touch-sensing surface, or may be caused by a conductive object in proximity to the touch-sensing surface.

One method for scanning a touch-sensing surface such as a touchpad or touchscreen involves scanning or measuring changes in self capacitance associated with each row or column sensor element in the touch-sensing surface. Thus, performing a scan of the entire touch-sensing surface may include taking a number of measurements equal to the sum of the number of row elements plus the number of column elements.

All-points sensing of the touch-sensing surface, in which the locations of multiple contacts at the touch-sensing surface are determined, may be performed using mutual capacitance measurements. Since mutual capacitance measurements are taken between a pair of sensor elements, such as a row sensor element and a column sensor element, the number of measurements for scanning the entire touch-sensing surface may be equal to the number of row elements multiplied by the number of column elements. As compared to the method for determining a contact location using self capacitance measurements, the mutual capacitance method for all-points detection uses more measurements and may have slower touch response. Since fewer measurements are performed when using self capacitance to determine a touch presence, it may also consume less power than using only mutual capacitance measurements, and thus provide benefits in hand-held or similar devices operating from battery-powered supplies.

One key measure or benchmark for user experience is the first-touch response time. The first-touch response time is the time between when a user initiates a contact with the touch-sensing surface, for example, by placing a finger or other object on the surface, and the time when a resolved location of the contact is reported to the system. For a touch-sensing surface using all-point scanning, the first-touch response time can extend to as much as twice the duration of time for performing a full scan of the touch-sensing surface. The reason for this extended delay is that a contact occurring just after the full-panel scan has started may be missed by the measurements taken during the remaining portion of that first scan period. Such a contact would not be reported following the first scan, but would be detected by a second scan of the entire touch-sensing surface and reported to the system following the second scan.

One embodiment of a touch-sensing system can reduce this first-touch response time to the duration of a full scan and processing of the touch-sensing surface plus some small additional duration. In one embodiment, the touch sensing surface may operate in two different modes: a search mode and a tracking mode. When operating in the search mode, the presence of at least one contact at the touch-sensing surface may be detected. In response to detecting the presence of the at least one contact, the mode of operation switches to the tracking mode, where the presence and location of the at least one contact, as well as the presences and locations of any other contacts at the touch-sensing surface, may be detected and reported to the system. In one embodiment, the system may perform self-capacitance measurements while in search mode and mutual capacitance measurements while in tracking mode.

FIG. 1 illustrates a block diagram of one embodiment of an electronic system 100 including a processing device 110 that may be configured to operate using a search mode and a tracking mode. The electronic device 100 includes a touch-sensing surface 116 (e.g., a touchscreen or a touch pad) coupled to a processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor. The self capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

The processing device 110 may reside on a common carrier substrate such as, for example, an integrated circuit (IC) die substrate, or a multi-chip module substrate. Alternatively, the components of the processing device 110 may be one or more separate integrated circuits and/or discrete components. In one embodiment, the processing device 110 may be the Programmable System on the Chip (PSoC®) processing device, developed by Cypress Semiconductor Corporation, San Jose, Calif. Alternatively, the processing device 110 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 110 may be a network processor having multiple processors including a core unit and multiple micro-engines. Additionally, the processing device 110 may include any combination of general-purpose processing device(s) and special-purpose processing device(s).

In one embodiment, the electronic system 100 is implemented in a device that includes the touch-sensing surface 116 as the user interface, such as handheld electronics, portable telephones, cellular telephones, notebook computers; personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
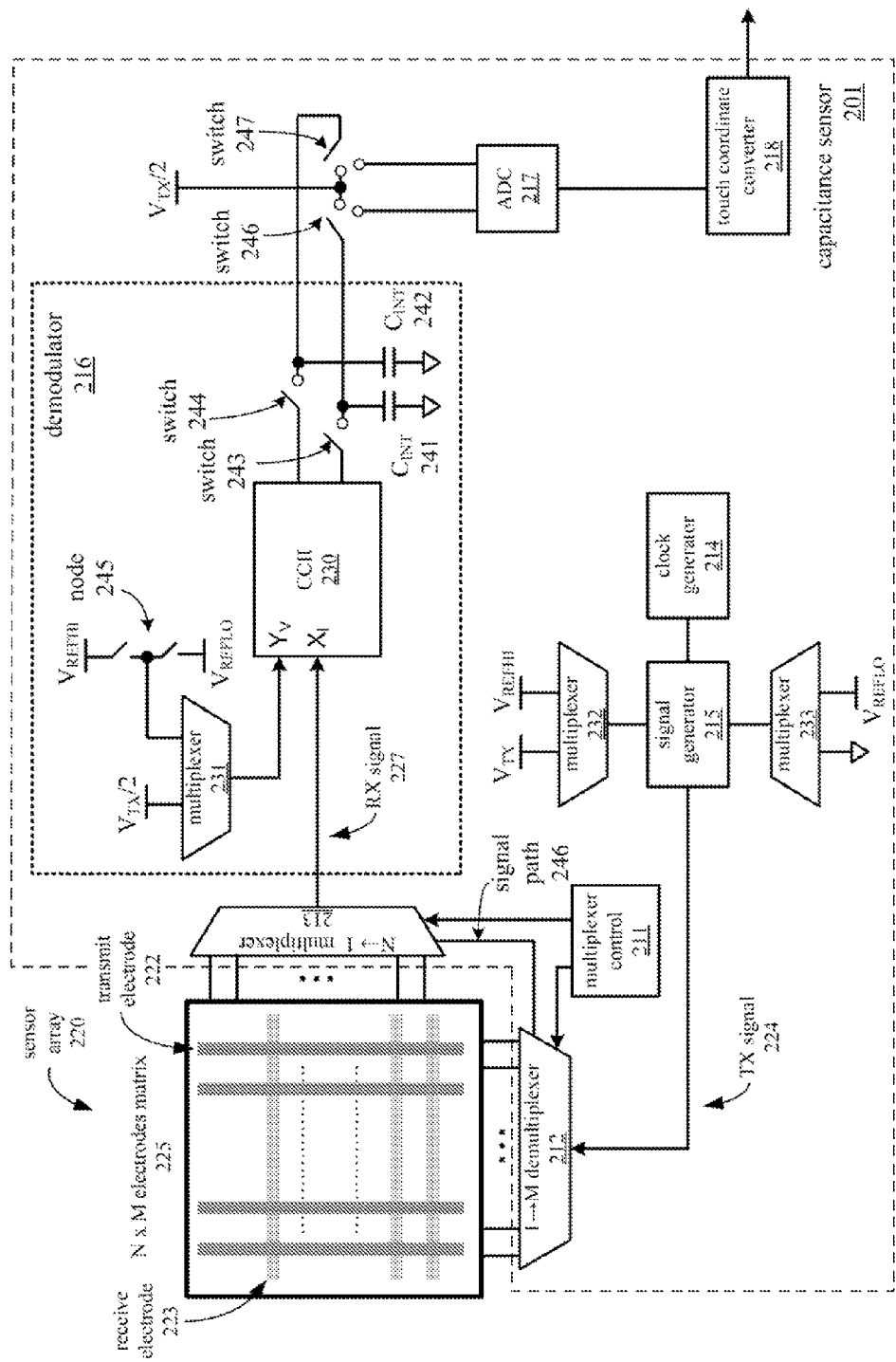
FIG. 2 is a block diagram illustrating an embodiment of an electronic system that processes touch sensor data.

FIG. 2 is a block diagram illustrating one embodiment of a capacitive touch sensor array 121 and a capacitance sensor 101 that may be configured to operate using a search mode and a tracking mode. In one embodiment, sensor array 220 and capacitance sensor 201 are implemented in a system such as electronic system 100. Sensor array 220 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensor circuit 201 through demultiplexer 212 and multiplexer 213.

Capacitance sensor 201 includes multiplexer control 211, demultiplexer 212, multiplexer 213, clock generator 214, signal generator 215, demodulation circuit 216, and analog to digital converter (ADC) 217. ADC 217 is further coupled with touch coordinate converter 218. Touch coordinate converter 218 outputs a signal that may be received by processing logic, such as processing logic 102.

Signal generator 215 is further coupled to multiplexers 232 and 233. Multiplexer 232 is configured to selectively connect signal generator 215 with either $V_{TX}$ or $V_{REFHI}$, while multiplexer 233 is configured to connect signal generator 215 with either ground or $V_{REFLO}$. Demodulator circuit 216 includes current conveyor (CCII) 230, whose voltage-control node Yv is coupled to multiplexer 231. Multiplexer 231 may be configured to selectively connect CCII 230 with either a reference voltage $V_{TX}/2$ or node 245 that can be switched between $V_{REFHI}$ and $V_{REFLO}$. CCII current-control node $X_1$ is further coupled to multiplexer 213 through RX signal 227. The output of CCII 230 is further coupled through demodulation switches 243 and 244 to integration capacitors CiNT 241 and Ow 242. These integration capacitors may be further connected through switches 246 and 247 to either a reference voltage $V_{TX}/2$, where they may be preset, or to differential inputs of ADC 217 for measurement.

In one embodiment, when the capacitance sensor 201 is configured to operate using a self-capacitance sensing method, then multiplexer 231 connects CCII 230 to node 245, multiplexer 232 connects signal generator 215 to $V_{REFLO}$, and multiplexer 233 connects signal generator 215 to $V_{REFLO}$. The signal output from signal generator 215 may thus be created to duplicate that generated by the CCII in demodulator block 216. Such signal, when applied to non-measured electrodes in matrix 225, may serve as a shield signal and prevent asymmetric coupling of the measured electrode(s) relative to the adjacent non-measured electrodes.

In this configuration, the capacitance sensor can perform a self capacitance measurement on the sensor elements (such as electrodes 222 or 223) in the sensor array 220. Performing a self-capacitance measurement of a sensor element may include switching node 245 alternately between $V_{REFHI}$ and $V_{REFLO}$ and applying the signal at node 245 to CCII 230 through multiplexer 231. This signal alternating between $V_{REFHI}$ and $V_{REFLO}$ is applied to a voltage control node Yv of CCII 230. In one embodiment, the CCII 230 is an amplifier with a feedback loop that drives its output so that the voltage present on its current control node matches that on its voltage control node. The current control node is connected through multiplexers 212 and 213 to a sensor element being sensed.

In one embodiment, multiplexers 212 and 213 may be connected by a signal path 246 so that the current control node $X_1$ of CCII 230 can be connected to any of the row or column sensor elements of sensor array 220. Specifically, CCII 230 can be connected to measure the self-capacitance of any row sensor element through multiplexer 213 or any column sensor element through multiplexer 213, signal path 246, and multiplexer 212. In another embodiment, multiplexers 212 and 213 may also be connected by a signal path 246 so that the shield drive output of signal generator 215 can be connected to any of the row or column sensor elements of sensor array 220.

With a sensor element connected to the current control node of CCII 230, the CCII 230 drives the sensor element to match the signal at the voltage control node of the CCII 230. The self-capacitance of the sensor element is thus charged and discharged by the CCII 230, which drives the sensor element to match the signal generated at node 245 which switches between $V_{REFHI}$ and $V_{REFLO}$. As a result of the charge and discharge cycle of the self-capacitance of the sensor element, charge may be presented at one or more outputs of CCII 230 and integrated on integration capacitors 241 and 242. In one embodiment, the capacitors 241 and 242 are alternately connected in a non-overlapping manner to the output of CCII 230, such that only one of the capacitors 241 or 242 is connected to CCI 230 at any given time. In one embodiment, the capacitor 241 is connected to CCI 230 during a negative portion of the cycle (when node 245 is connected to $V_{REFLO}$) and capacitor 242 is connected to CCI 230 during a positive portion of the cycle (when node 245 is connected to $V_{REFLO}$). The charge integration thus causes differing voltages at capacitors 241 and 242. Following the integration of charge from one or more cycles, switches 246 and 247 may be changed to connect the integration capacitors to the differential inputs of ADC 217. When so closed, the voltage present on capacitors 241 and 242 may be presented to ADC 217 through switches 246 and 247 respectively, and the voltage difference may be measured at a pair of differential inputs of ADC 217. Following a measurement, switches 246 and 247 may connect the integration capacitors 241 and 242 to a reference voltage, for example $V_{TX}/2$, to initialize them prior to the next integration operation. In an alternate embodiment the initialize voltage may be other than $V_{TX}/2$. In an alternate embodiment the initialization voltage may be different for each of the integration capacitors 241 and 242.

When a conductive object is in proximity to the sensor element for which self-capacitance is being measured, the rate of charge integration at capacitors 241 and 242 changes because the self-capacitance of the sensor element changes. With the duration over which the integration takes place held constant, a potential difference between the capacitors 241 and 242 can be measured by ADC 217 and correlated to the location of the sensor element to determine the approximate location of the conductive object. According to this technique, the potential difference measured by ADC 217 changes depending on whether or not a conductive object is near the sensor element being sensed.

In one embodiment, noise coupling into the sensor element being measured, as well as asymmetries in measured signal due to adjacent non-measured sensors, may be reduced by using signal generator 215. When configured to perform self-capacitance measurements, the multiplexer 232 connects signal generator 215 to $V_{REFHI}$ while multiplexer 233 connects signal generator 215 to $V_{REFHI}$. Signal generator 215 switches between $V_{REFHI}$ and $V_{REFLO}$ in parallel with the switching of node 245 between $V_{REFHI}$ and $V_{REFLO}$. Thus, the signal is replicated, and is applied to the sensor elements in sensor array 220 that are not being sensed by CCII 230. The signal from signal generator 215 may be applied to the sensor elements through demultiplexer 212 and/or signal path 246 and multiplexer 213.

When capacitance sensor 201 is configured to perform mutual capacitance measurements of the sensor elements in sensor array 220, the multiplexer 231 connects the voltage control node of CCII 230 to a reference voltage with a value of $V_{TX}/2$. Multiplexers 232 and 233 may connect signal generator 215 to a voltage $V_{TX}$ and ground, respectively. For a mutual capacitance measurement, the signal generator 215 applies a TX signal to one or more of the sensor elements, and the demodulator 216 measures an RX signal 227 resulting from capacitive coupling between the sensor element to which the TX signal is applied and the sensor element at which the RX signal is measured, as selected by multiplexer 213.

The transmit and receive electrodes in the electrode matrix 225 may be arranged so that each of the transmit electrodes overlap and cross each of the receive electrodes such as to form an intersection, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 intersect.

Clock generator 214 supplies a clock signal to signal generator 215, which produces a TX signal 224 to be supplied to the one or more enabled transmit electrodes of touch sensor 220. In one embodiment, the signal generator 215 includes a set of switches that operate according to the clock signal from clock generator 214. The switches may generate a TX signal 224 by periodically connecting the output of signal generator 215 to $V_{TX}$ and ground through multiplexers 232 and 233, respectively. In alternative embodiments, rx and ground may be replaced by other voltage values.

The output of signal generator 215 is connected with demultiplexer 212, which allows the TX signal 224 to be applied to any of the M transmit electrodes of touch sensor 220. In one embodiment, multiplexer control 211 controls demultiplexer 212 so that the TX signal 224 is applied to each transmit electrode in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between the two electrodes 222 and 223. Thus, the location of the finger on the touchpad may be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225 the locations of one or more contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

With regard to capacitance sensor 201, measuring the mutual capacitance at an intersection includes converting the induced current waveform 227 to a potential difference using demodulation circuit 216. When configured to perform mutual capacitance measurements, the voltage control node of CCII 230 may be connected through multiplexer 231 to reference voltage $V_{TX}/2$. In one embodiment, the CC1I 230 is an amplifier with a feedback loop that drives its output so that the voltage present on its current control node matches that on its voltage control node. CCII 230 thus outputs a current to maintain its current control node near $V_{TX}/2$. Thus, based on the TX signal, current alternately flows into and out of the current control node of CCII 230. The output of CCII 230 is connected to integration capacitors 241 and 242 through switches 243 and 244, respectively. In one embodiment, switches 243 and 244 operate in non-overlapping fashion so that capacitor 241 is connected when the output of signal generator 215 is at ground, and capacitor 242 is connected when the output of signal generator 215 is at $V_{TX}$. The charge integration thus results in different voltages at capacitors 241 and 242, and the voltage difference between capacitors 241 and 242 may be measured at the differential inputs of ADC 217 and converted to a digital code.

The digital code may be converted to touch coordinates indicating a position of an input on touch sensor array 121 by touch coordinate converter 218.

Figure 3A:
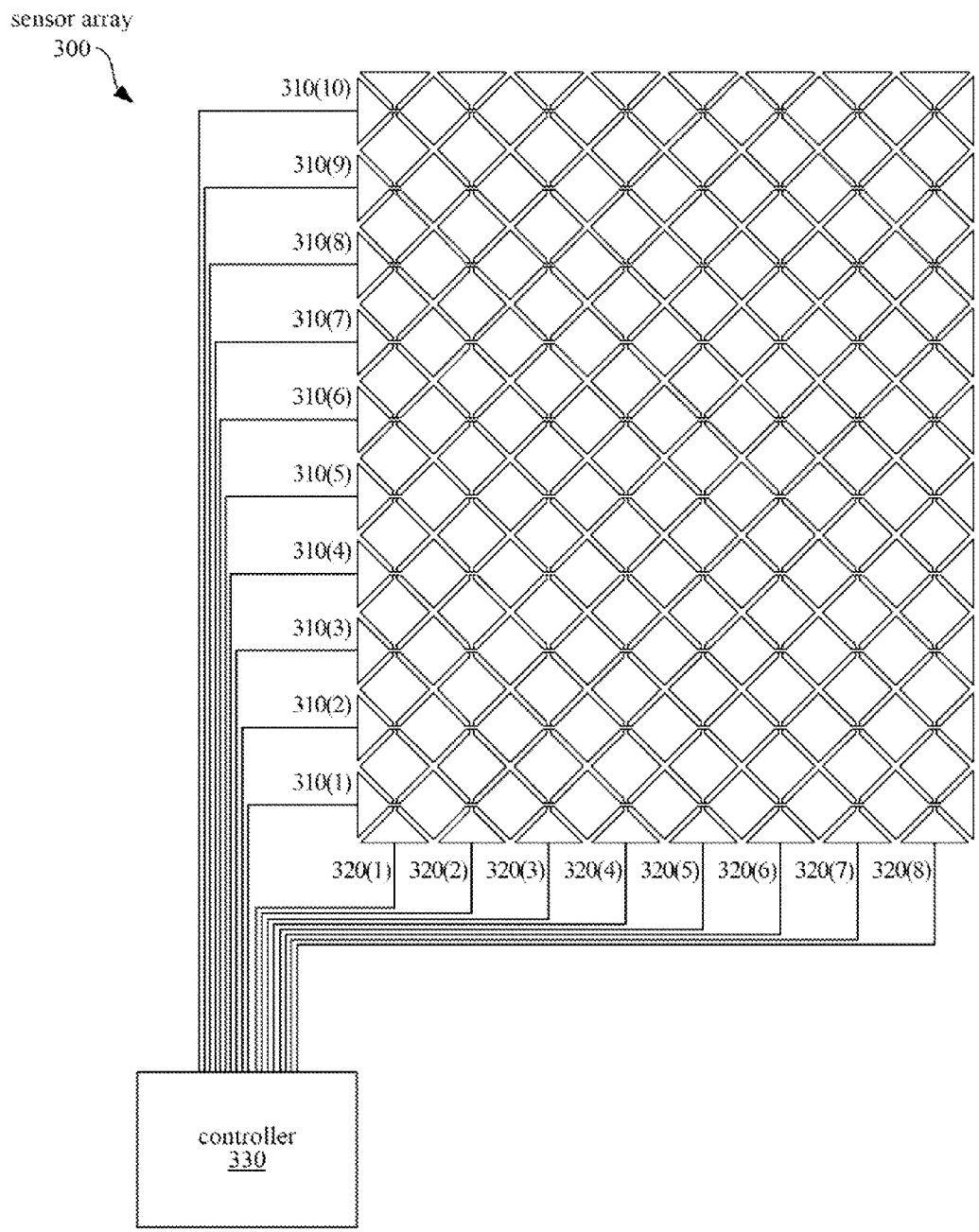
FIG. 3A illustrates a touchscreen controller and sensor array, according to an embodiment.

FIG. 3A illustrates a sensor array 300 that is connected to a controller 330. In one embodiment, sensor array 300 may correspond to sensor array 121 in electronic system 100, while the controller 330 may correspond to the processing device 110.

In one embodiment, the controller 330 is capable of measuring both self capacitances of sensor elements (between the sensor element and a reference node such as ground) and mutual capacitances between sensor elements. Thus, the controller 330 may be used in a self-capacitance mode to determine a presence, but not necessarily a location, of a contact or a conductive object in proximity to the touch-sensing surface having a sensor array 300. The controller 330 may further be configured to, in response to detecting a presence of a contact using a self capacitance sense method in a search mode, switch to a mutual capacitance sense method to perform a scan in tracking mode of all or a portion of the intersections of sensor elements in the sensor array 300 to resolve the actual location of one or more contacts.

The sensor array 300 illustrated in FIG. 3A, has 10 row sensor elements 310(1)-310(10) and 8 column sensor elements 320(1)-320(8). In mutual capacitance mode, the controller 330 may scan each intersection of a row sensor element and a column sensor element. The controller thus performs 80 sense operations (10 row elements×8 column elements) to scan the entire panel. Assuming that each sense operation takes 200 1-1S, a scan of the entire sensor array 300 in mutual capacitance mode would take at least 16 ms.

In one embodiment, the controller 330 initially operates in self capacitance mode. Scanning of the entire sensor array 300 in a self-capacitance mode can be accomplished with 18 sense operations (10 rows+8 columns). Assuming a similar time (200 !As) per sense operation, a scan of the entire sensor array 300 would take 3.6 ms. This time can be further reduced if the purpose of the scan is to determine the presence of a contact without regard to the location of the contact. To determine the presence of a touch without regard to location, a set of sensor elements may be scanned, such as a subset including only the row elements or only the column elements. Alternatively, the scanned subset may include only alternate row or column elements, or may include only enough sensor elements such that a contact may be detected reliably. The scan of this set of sensor elements may be performed using a single sense channel. In one embodiment, a sense channel includes hardware capable of performing a single capacitance measurement at a given time. Assuming a similar time per sense operation of 200 μs the duration of such a scan could be reduced to as little as 1.6 ms when the sensors of only the vertical axis 320(1)-320(8) are measured individually.

In one embodiment, the controller 330 in self capacitance mode determines that a contact is present at the touch-sensing surface if the measured self capacitance of any of the scanned sensor elements exceeds a threshold.

In one embodiment, the self capacitance scan time can be decreased even more through the use of parallel sensing. For example, a controller 330 may include eight capacitive sensing channels operating in parallel, such as those found in the CY8CTMA300E, manufactured by Cypress Semiconductor Corporation of San Jose, Calif. With parallel sensing, capacitance sensing of the entire panel may be accomplished using 10 sense operations, since the column elements may be sensed simultaneously. This reduces the scanning overhead time and allows more time for computation intensive functions such as touch location resolution and finger tracking, and for sleep operations to conserve power.

In a search mode, the controller scans the sensor array 300 by performing self capacitance measurements on sensor elements of the sensor array 300. In one embodiment, the controller 330 scans a set of sensor elements, such as all of the sensor elements or a subset of all the sensor elements in the sensor array 300. For example, the controller 330 operating in self capacitance mode may scan the row sensor elements 310 without scanning the column sensor elements 320. Alternatively, the controller may scan the column sensor elements 320 without scanning the row sensor elements 310. Still alternatively, the controller may alternately scan the column sensor elements 320 and the row sensor elements 310.

In one embodiment, the self capacitance scan may be run repeatedly in a loop much faster than scanning the entire panel. Assuming similar measurement times for a single self capacitance measurement as for a mutual capacitance measurement, and that the computation time for the threshold analysis is simpler than the calculation of contact locations, the maximum first-touch delay may be significantly reduced. In one embodiment, the maximum first-touch response delay is changed from approximately twice the duration of a full mutual capacitance scan to the duration of a full scan plus the duration of one self-capacitance measurement. In one embodiment, when a contact is detected at the touch sensing surface, the controller 330 switches to operation in tracking mode, scanning the sensor elements of sensor array 300 using the mutual capacitance method to resolve the locations of the contacts.

In one embodiment, one or more contacts at the touch sensing surface may be located during a tracking mode resolve scan using a combination of data provided by a preceding self capacitance scan. For example, determining the locations of the one or more contacts while in tracking mode may include using information from a search scan performed using a self capacitance sense method to identify possible contact locations, then performing a resolve scan while in tracking mode to identify which of the possible contact locations may be actual contact locations. In one embodiment, the resolve scan includes a mutual capacitance scan of each of the possible contact locations.

Figure 3B:
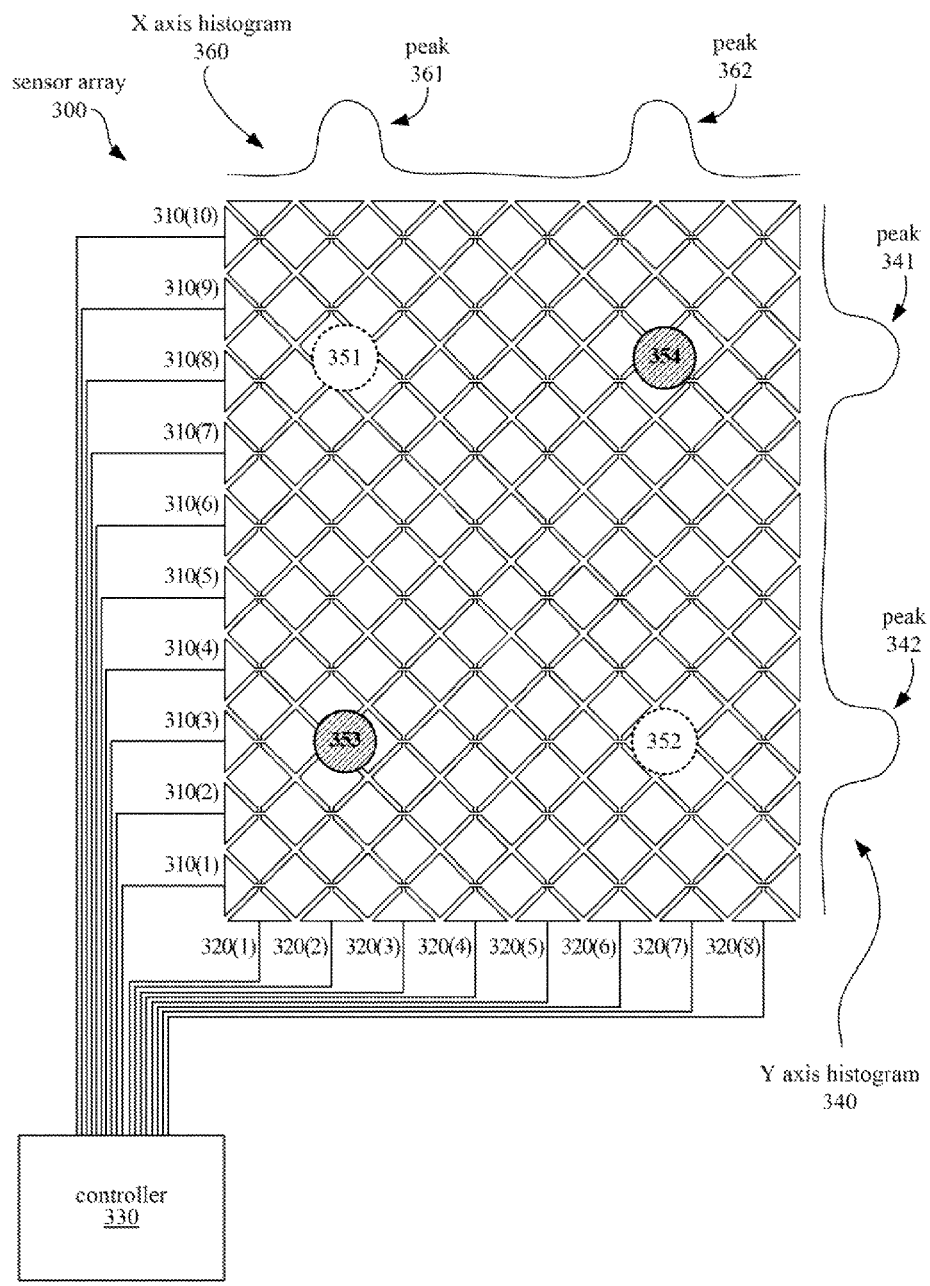
FIG. 3B illustrates a touchscreen controller and sensor array, according to an embodiment.

With regard to FIG. 3B, a complete scan of the sensor array 300 using a self capacitance method would include N+M self capacitance measurements for a matrix of N rows×M columns of sensor elements. For the case where C contacts are being applied to the touch-sensing surface, a maximum of $C^2$ possible contact locations may be detected using a self capacitance scan. The possible contact locations can be resolved to the C actual contact locations using a resolve scan. In one embodiment, the resolve scan includes a mutual capacitance measurement of each pair of sensor elements having intersections at all of the possible contact locations 351-354.

In one embodiment, performing the tracking mode scans according to this method can significantly reduce the mutual capacitance scan times. For example, for a sensor array having 100 row sensor elements and 100 column sensor elements, five simultaneous contacts can be resolved using a maximum of 225 capacitance measurements, rather than the 10,000 capacitance measurements that may be used if every row and column intersection is measured using a mutual capacitance method.

Sensor array 300, illustrated in FIG. 3B, includes horizontal sensing elements 310(1)-310(10) and vertical sensing elements 320(1)-320(8). In one embodiment, the touch sensing system performs an initial search scan of the sensor array 300 in self capacitance mode by taking measurements of each sensing element in a sequence. For example, the search scan may measure the capacitance at each of the sensing elements 310(1)-310(10) in a sequence, and then measure the capacitance at each of the sensing elements 320(1)-320(8) in a sequence. Alternatively, using additional sense channels, the search scan may measure two or more of the sensing elements in parallel. In one embodiment, the result of such a scan may be a histogram 360 for the horizontal (X) axis and a similar histogram 340 for the vertical (Y) axis.

The X axis histogram 360 represents the capacitances measured at the vertical sensor elements 320(1)-320(8). Since contacts at the touch sensing surface affect these measured capacitances, the locations of such contacts along the X axis may be represented as peaks in the X axis histogram. For example, if two contacts 353 and 354 are applied to the touch sensing surface, the locations along the X axis of contact 353 and contact 354 are represented as peaks 361 and 362, respectively, in histogram 360. Similarly, the Y axis histogram 340 represents the capacitances measured at the horizontal sensor elements 310(1)-310(10). Thus, the locations of contacts 353 and 354 along the Y axis are represented as peaks 342 and 341, respectively, in the Y axis histogram 340.

In one embodiment, when only a single contact is applied to the touch sensing surface, the system may determine the location of the single contact based on the X and Y search scan histograms, since the peak of each histogram indicates the row and column locations of the finger contact. However, when multiple contacts are present, the histograms may indicate a number of possible contact locations. For example, when the actual contacts 353 and 354 are applied to the touch sensing surface, the resulting peaks 361, 362, 341, and 342 indicate additional possible touch locations 351 and 352.

For example, whether the two contacts are at locations 351 and 352, or whether the two contacts are at locations 353 and 354, identical histograms may result. When additional actual contacts are added, the number of possible contact locations also increases. For N actual contacts, the resulting histograms may indicate up to $N^2$ possible contact locations.

In order to determine that the contacts 353 and 354 are the actual contact locations from among the possible contact locations 351, 352, 353, and 354, the system may change to mutual capacitance sensing and perform an additional resolve scan. In one embodiment, the system may perform a resolve scan of the intersections of horizontal and vertical sensor elements corresponding to one or more of the peaks, such as peaks 361, 362, 341, or 342, detected during the initial scan.

In one embodiment of an electronic system that performs a resolve scan for detecting multiple touches, the system begins by performing a search mode scan of all row and column sensing elements sequentially or in parallel, using a self capacitance measurement technique. The system then performs a resolve scan measuring mutual capacitances when possible contact locations are detected. In one embodiment, if multiple peaks, such as peaks 361 and 362, are detected in the X axis histogram and multiple peaks, such as peaks 341 and 342, are detected in the Y axis histogram, the system performs the resolve scan.

In one embodiment, performing the resolve scan may include performing a mutual capacitance measurement of all intersections of X and Y sensor elements where a possible touch may exist as indicated by the histogram peaks acquired from a search scan. Note that it is necessary to scan all such possible locations, because the histograms 340 and 360 could be generated by touch location combinations of a) 351 and 352, b) 353 and 354, c) 351, 352, and 353, d) 351, 352, and 354, e) 352, 353, and 354, f) 351, 353, and 354, and 351, 352, 353, and 354.

The system thus conducts a first mutual capacitance measurement of the intersection between sensor elements 320(2) and 310(3), a second mutual capacitance measurement of the intersection between sensor elements 320(2) and 310(8), a third mutual scan measurement of the intersection between sensor elements 320(7) and 310(3), and a fourth mutual scan measurement of the intersection between sensor elements 320(7) and 310(8). In one embodiment, an ADC value measured from the first mutual capacitance measurement of an identified intersection (e.g. 320(2) and 310(3)), when compared to a baseline value for that same intersection, will be lower than a baseline value for that intersection. Relative to the exemplary touch locations 353 and 354 as indicated in FIG. 3B, because the contacts are applied near the intersection of sensor elements 320(2) and 310(3) and near the intersection of elements 320(7) and 310(8), the mutual capacitances between these sensor elements 320(2) and 310(3), and 320(7) and 310(8) are reduced, while the corresponding mutual capacitances between the sensor elements 320(2) and 310(8), and 320(7) and 310(3) are not reduced. The system can then deduce that the actual contacts are located at locations 353 and 354, rather than at 351 and 352.

In one embodiment, the ADC values measured from each of the resolve scans may be compared to each other to determine the location of the actual contact. Alternatively, the resolve scan ADC values may be compared with the ADC values measured from a baseline measurement of an intersection, taken when no contact is present at the intersection. The system can then determine the actual contact locations based on this comparison.

In one embodiment, the sensor array may be a capacitive sensor having enhanced sensitivity to changes in mutual capacitance between sensor elements, rather than to changes in self capacitance of each sensor element.

One embodiment of an electronic system such as system 100 may include a touch sensor array having N rows and M columns. Such an electronic system may include processing logic, such as processing logic 102 that is configured to detect multiple contacts at a touch sensing surface.

For example, a user may place two fingers of the same hand to the touch sensing surface, and the system may detect the locations of the two fingers. With reference to FIG. 3B, the fingers may contact the sensing surface at locations 353 and 354, resulting in peaks 361 and 362 in the X axis histogram 360 and peaks 342 and 341 in the Y axis histogram 340.

In one embodiment, prior to performing the resolve scan, the system may assess the data from the histograms to eliminate special cases where the resolve scan may not be needed. For example, if two contacts exist that are aligned in the X or Y directions, the resolve scan may not be performed. In this case, the two contacts result in only two possible contact locations because one of the histograms detects only one peak for both contacts. In response to detecting this case, the system may determine both of the possible contact locations to be actual contact locations.

Thus, a controller 330 can determine the possible locations of one or more contacts at the touch sensing surface when operating in the tracking mode. When a tracking mode scan subsequently determines that contacts are no longer present at the touch-sensing surface, the controller 330 may be reconfigured to revert to a search mode where it may look for the presence of contacts using a self capacitance mode.

In one embodiment, the delay between detecting that no contacts are present at the touch-sensing surface and switching to self capacitance search mode may be configurable. In one embodiment, the switch from mutual capacitance tracking mode to self capacitance search mode occurs immediately following a complete tracking mode scan of the sensor array 300 during which no contacts are detected.

In one embodiment, the axis with fewer sensor elements is scanned during a search scan using the self capacitance method to reduce the time for completing the scan. For example, controller 330 may scan the eight column sensor elements 320 rather than the ten row sensor elements 310. In one embodiment, where the controller 330 includes multiple parallel sense channels, the self capacitance measurements for each of the sensor elements being scanned may be taken simultaneously.

In one embodiment, when performing self capacitance measurements for detection of presence of contact, sensor elements in the sensor array 300 may be grouped together to reduce power consumption. For example, in sensor array 300, the column sensor elements 320 may be connected together and sensed using a single sense channel. By connecting a group of sensor elements together, such as column elements 320, power consumption during a search scan may be reduced to that of a single sense channel. This method may be used to reduce overall power consumption when determining the presence of a contact at the touch-sensing surface in the search mode.

In an alternative embodiment, when sensing the column elements 320 for self capacitance, the row elements 310 may be driven with a common shield drive signal. In this case, the signal to noise ratio may be improved because the charge may not be coupled through all the intersections in each column to rows that each column intersects. Thus, the change in coupled charge attributable to a contact at the touch-sensing surface may be increased.

In one embodiment, the sensor elements 310 and 320 of the sensor array 300 may be divided into a number of zones. For example, the sensor array 300 may be divided into two zones, each including a subset of five row sensor elements. The presence of a contact at the touch-sensing surface can then be determined by a pair of sense operations, with one sense operation for each zone. In this case, if a contact is detected at either of the two zones during a search scan, the controller 330 can be reconfigured to tracking mode to scan either the entire sensor array 300 to determine the locations of any contacts at the touch-sensing surface, or just that zone wherein a one or more contacts was detected.

In one embodiment, the zones may be interleaved so that the sensor elements of one zone are interleaved with the sensor elements of another zone. For example, a first zone may include the, odd numbered rows 310(1), 310(3), 310(5), 310(7), and 310(9) of sensor array 300, while a second zone may include the even numbered rows 310(2), 310(4), 310(6), 310(8), and 310(10). In one embodiment where the rows are spaced sufficiently close together, a high probability exists that a finger or other object contacting the touch-sensing surface can be detected by a search scan of at least one of the zones.

In one embodiment, the search scan may be performed repeatedly on a single zone, or alternatively, may alternate between two or more zones. In one embodiment, the sensor array 300 matrix may be reversed. For example, row elements that were previously driven with a shield signal can be configured to measure for self capacitance while the column elements previously configured to measure self capacitance are driven with a shield signal.

Figure 4:
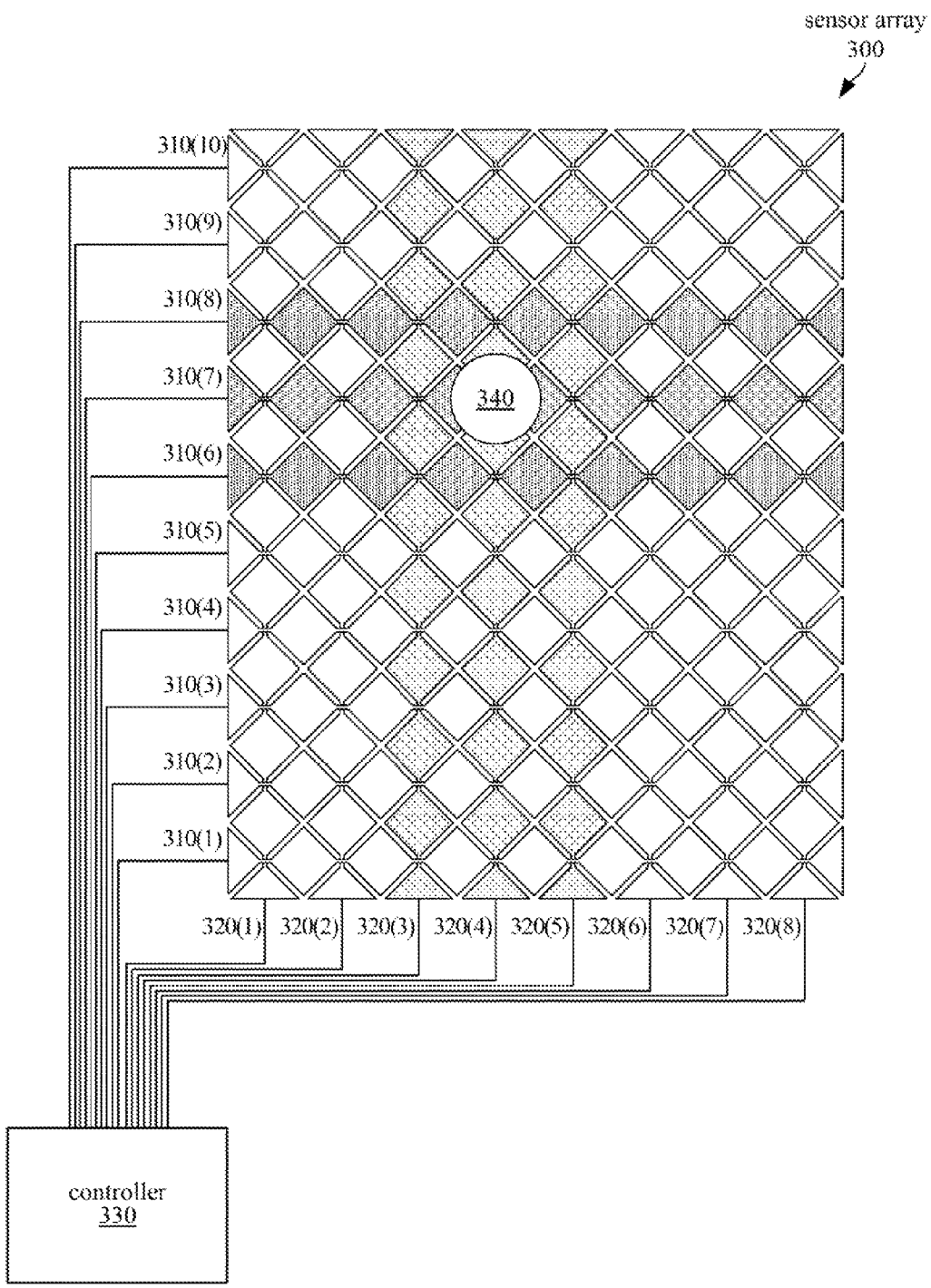
FIG. 4 illustrates a touchscreen controller and sensor array, according to an embodiment.

FIG. 4 illustrates the sensor array 300 connected with a controller 330, which are also illustrated in FIGS. 3A and 3B. FIG. 4 also illustrates a contact 340 at the intersection of row sensor element 310(7) and column sensor element 320(4).

In one embodiment, the controller 330 performs a search scan to identify an initial location of the contact 340, identifies a subset of active sensor elements based on the initial location of the contact 340, then enters a tracking mode where the controller 330 scans the subset of active sensor elements using a mutual capacitance measurement method to track the movement of contact 340. As illustrated in FIG. 4, the controller may measure intersections associated with a subset of active sensor elements including row sensor elements 310(6), 310(7), and 310(8) and column sensor elements 320(3), 320(4), and 320(5).

For example, a controller 330 may detect the presence of the contact 340 using a self capacitance measurement method while in a search mode, as previously described. In response to determining the presence of the contact 340, the controller 330 may transition to a tracking mode. The controller 330 may then identify a subset of sensor intersections wherein mutual capacitance should be measured based on the initial location of the contact 340. In one embodiment, the initial row or column location of the contact 340 may be determined from a self capacitance scan performed while in search mode.

In one embodiment, the controller 330 may identify an active subset of sensor elements where each of the sensor elements in the subset is adjacent to a sensor element over which the initial location of contact 340 lies. For example, each of the sensor elements 310(6), 310(7), 310(8), 320(3), 320(4), and 320(5) in the subset of sensor elements illustrated in FIG. 4 lies under contact 340 or is adjacent to a sensor element lying under contact 340. In an alternative embodiment, the active subset of sensor elements may be chosen such that each sensor element in the active subset intersects another sensor element within a threshold radius of a centroid location calculated for the initial location of contact 340. In one embodiment, the active subset is determined according to some other criteria indicating that certain sensor elements are likely to be affected by future movement of the contact 340. In one embodiment, the controller 330 reduces the scan time for determining locations of contacts at the touch sensing surface by performing mutual capacitance measurements of intersections between the active sensor elements in the active subset while refraining from measuring intersections between inactive sensor elements. For example, a tracking scan may be performed using a mutual capacitance method that measures each of the intersections between row and column sensor elements in the active subset.

In an embodiment that does not refrain from scanning inactive sensor elements, measurements are taken at all intersections of sensor elements in sensor array 300, and used as a basis for calculating a centroid location of the contact 340. For example, sensor array 300 includes 18 sensor elements: ten row sensor elements 310 and eight column sensor elements 320. Thus, a mutual capacitance scan of every intersection of sensor elements in the sensor array 300 would include 8×10, or 80, mutual capacitance measurements.

However, assuming that the controller performs mutual capacitance measurements at the intersections of six of the 18 sensors to track the contact 340, the speed of the resolve scan can be increased by avoiding the measurement of intersections of the twelve inactive sensor elements. This can also reduce power consumption by the scanning operation. Assuming that six of the sensor elements, 310(6), 310(7), 310(8), 320(3), 320(4), and 320(5), of sensor array 300 are in the active subset, the mutual capacitance scan includes 9 intersections. This takes significantly less time than the full scan of all 80 intersections of the sensor elements.

Figure 5:
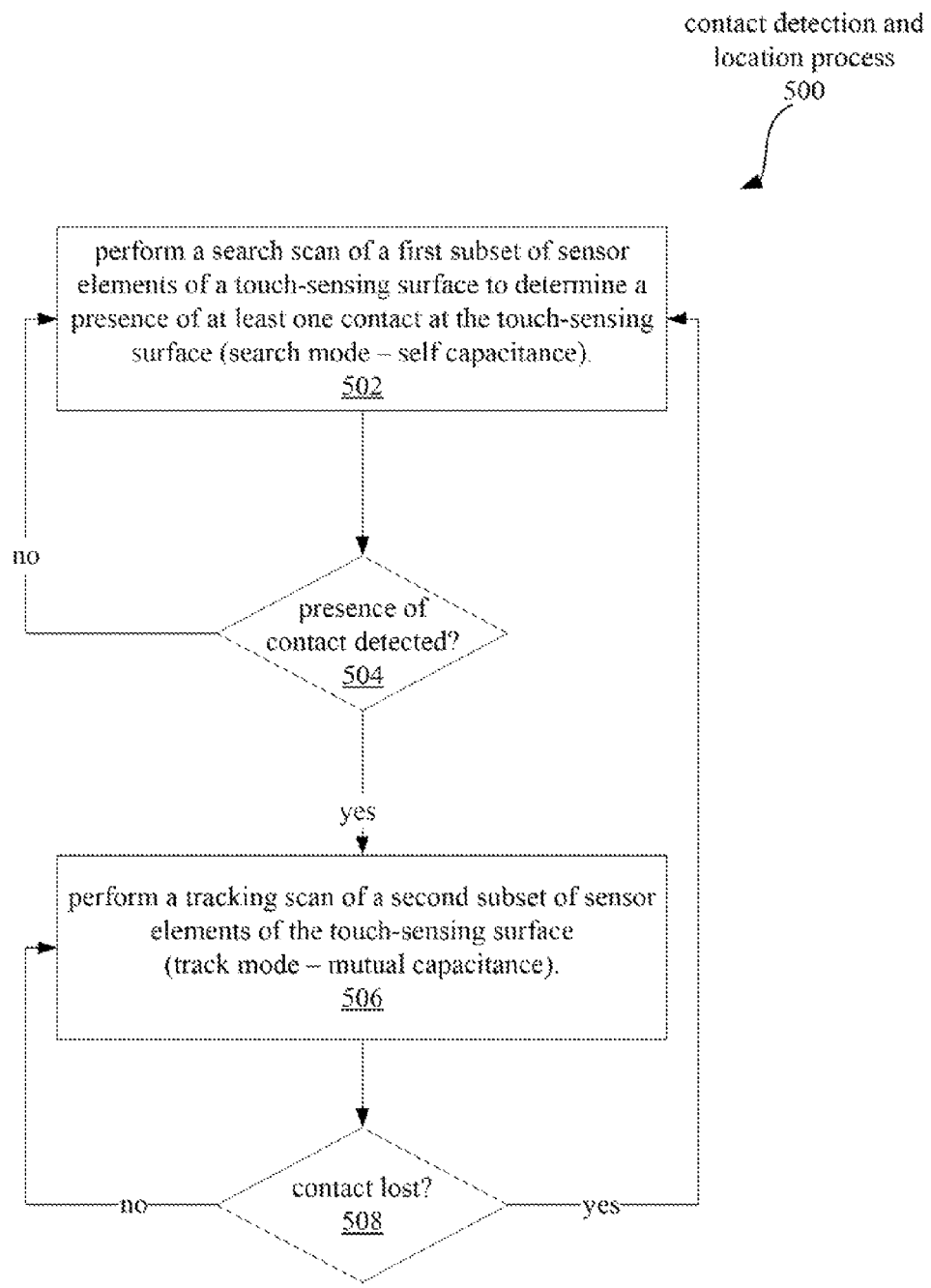
FIG. 5 is a flow diagram illustrating a process for detecting and locating a conductive object at a touch-sensing surface, according to an embodiment.

FIG. 5 is a flow diagram illustrating a process for detecting and locating at least one contact at a touch-sensing surface, according to an embodiment. Contact detection and location process 500 may be performed by a controller such as controller 330 illustrated in FIGS. 3A, 3B, and 4.

The contact detection and location process 500 begins at block 502. At block 502, the controller 330 performs a search scan of a first set of sensor elements of a touch-sensing surface to determine a presence of at least one contact that the touch sensing surface. In one embodiment, the scan of block 502 is performed while the controller 330 is operating in a search mode. For example, the controller 330 may perform a search scan of sensor array 300, as illustrated in FIG. 4. The search scan may include self capacitance measurements of a set of sensor elements, which may include all or a subset of the sensor elements of sensor array 300. In one embodiment, each of the sensor elements in a scanned subset may be a row sensor element 310. Alternatively, each of the sensor elements in the scanned subset may be a column sensor element 320. From block 502, the process 500 continues at block 504.

At block 504, the controller determines whether a contact at the touch sensing surface was detected by the scan performed at block 502. If no contact was detected by the scan of block 502, the process 500 continues back to block 502, where the search scan is repeated. Thus, blocks 502 and 504 may be repeated while the controller 330 is operating in search mode until a contact is detected. If at least one contact is detected by the scan of block 502, the process continues at block 506.

At block 506, the controller 330 performs a tracking scan of a second set of sensor elements of the touch-sensing surface. In one embodiment, the controller performs the tracking scan while operating in a tracking mode. In one embodiment, the tracking scan may include a mutual capacitance scan for each intersection of a row element 310 and a column element 320 of sensor array 300. In an alternative embodiment, the tracking scan includes identifying and scanning a subset of active sensor elements based on a last known location of the contact. For example, a subset of six active sensor elements 310(6), 310(7), 310(8), 320(3), 320(4), and 320(5) may be included in an active subset for a contact at location 340. In one embodiment, the tracking scan may include a mutual capacitance resolve scan of all intersections of the sensor elements in the active subset to identify the actual contact locations from among a set of possible contact locations determined from the search scan. From block 506, the process 500 continues at block 508.

At block 508, the controller 330 determines whether the contact is no longer present from the touch-sensing surface. If the contact is still present at the touch-sensing surface and has not been lost, the process 500 continues back to block 506, where the tracking scan is repeated. Thus, the tracking scan may be repeated to continuously track the location of the one or more contacts until the contact is lost. If, at block 508, the contact is lost, the process 500 continues back to block 502, where the controller 330 transitions back to search mode.

Figure 6:
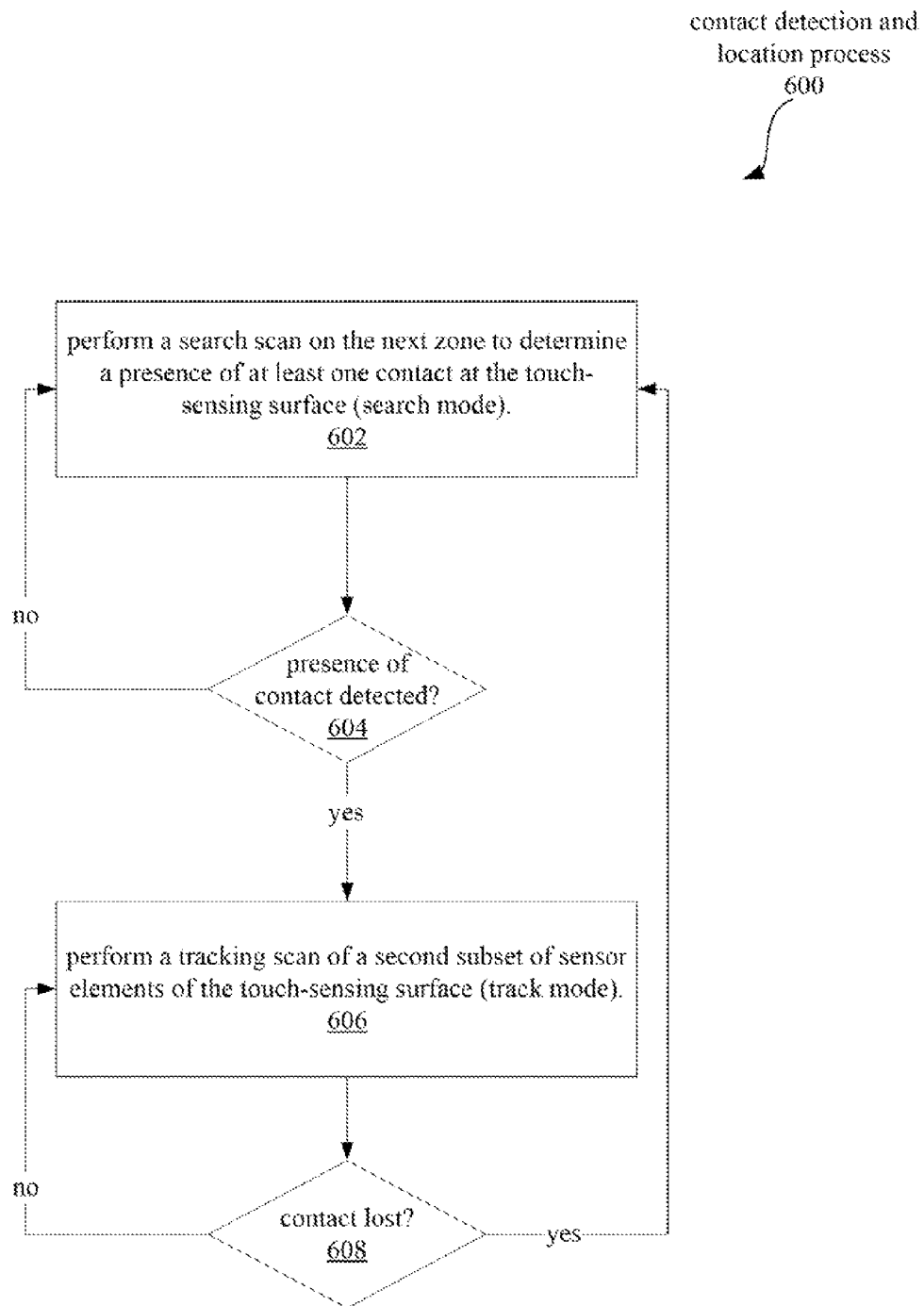
FIG. 6 is a flow diagram illustrating a process for detecting and locating a conductive object at a touch-sensing surface, according to an embodiment.

FIG. 6 is a flow diagram illustrating a process for detecting and locating at least one contact at a touch-sensing surface, according to an embodiment. Contact detection and location process 600 may be performed by a controller such as controller 330 illustrated in FIGS. 3A, 3B, and 4.

The contact detection and location process 600 begins at block 602. At block 602, the controller 330 performs a search scan of a zone of a touch-sensing surface to determine a presence of at least one contact that the touch sensing surface. In one embodiment, the scan of block 602 is performed while the controller 330 is operating in a search mode. From block 602, the process 600 continues at block 604.

At block 604, the controller determines whether a contact at the touch sensing surface was detected by the scan performed at block 602. If no contact was detected by the scan of block 602, the process 600 continues back to block 602, where the search scan is repeated on the next zone. Thus, blocks 602 and 604 may be repeated to scan each zone in sequence while the controller 330 is operating in search mode until a contact is detected. For example, if the sensor array 300 is divided into two zones, the controller 330 may alternately scan the first zone and the second zone. In one embodiment, the each zone includes sensor elements that are contiguous. Alternatively, each zone may include sensor elements that are interleaved with sensor elements of one or more other zones. If at least one contact is detected by the scan of block 602, the process continues at block 606.

At block 606, the controller 330 performs a tracking scan of a second subset of sensor elements of the touch-sensing surface. In one embodiment, the controller performs the tracking scan while operating in a tracking mode. In one embodiment, the tracking scan according to block 606 may be similar to the tracking scan according to block 506. From block 606, the process 600 continues at block 608.

At block 608, the controller 330 determines whether a contact is present on the touch-sensing surface. If a contact is still present at the touch-sensing surface and has not been lost, the process 600 continues back to block 606, where the tracking scan is repeated. Thus, the tracking scan may be repeated to continuously track the location of the one or more contacts until contact is lost. If, at block 608, contact is lost, the process 600 continues back to block 602, where the controller 330 transitions back to search mode.

Figure 7:
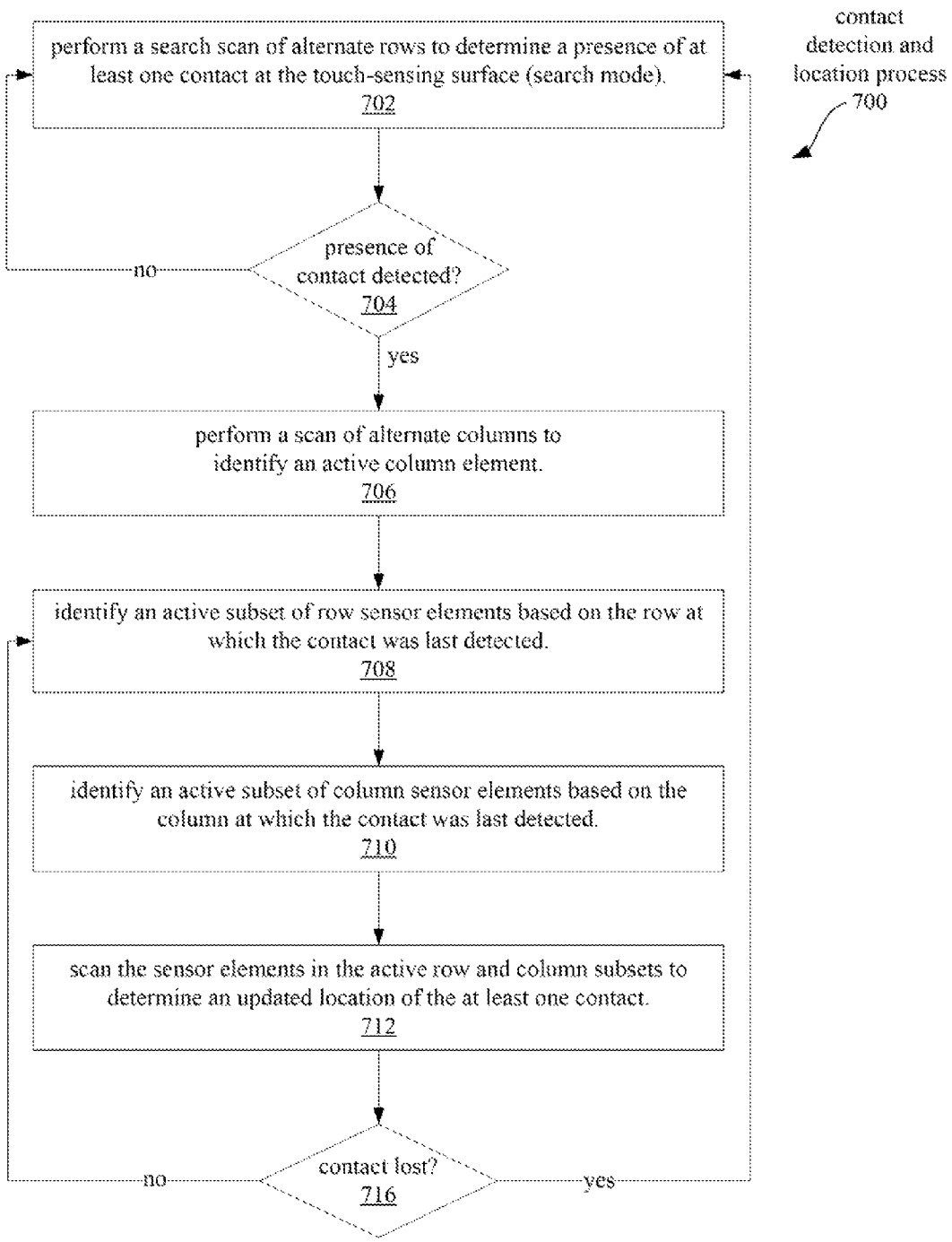
FIG. 7 is a flow diagram illustrating a process for detecting and locating a conductive object at a touch-sensing surface, according to an embodiment.

FIG. 7 is a flow diagram illustrating a process for detecting and locating at least one contact at a touch-sensing surface, according to an embodiment. Contact detection and location process 700 may be performed by a controller such as controller 330 illustrated in FIGS. 3A, 3B, and 4.

Contact detection and location process 700 begins at block 702, where the controller 330 operates in search mode, performing a search scan of alternate rows to determine a presence of at least one contact at the touch-sensing surface. In an alternative embodiment, the search scan is performed by scanning all the rows, all the columns, alternating columns, or another subset of the sensor elements in the sensor array 300. In one embodiment, the controller 330 scans a minimum number of sensor elements for a contact to be reliably detected. From block 702, the process 700 continues at block 704.

At block 704, the controller 330 determines whether at least one contact is detected at the touch-sensing surface. If, at block 704, at least one contact is not present at the touch-sensing surface, the process 700 continues back to block 702, where the search scan is repeated. In one embodiment, if block 702 is entered from block 704, the operation in block 704 may also be modified to sense elements other than those measured in the previous pass through block 702. Thus, the search scan may be repeated until a contact is detected. If, at block 704, the contact is detected at the touch-sensing surface, the process 700 continues at block 706

At block 706, the controller 330 performs a scan of alternate columns to identify an active column element. In an alternative embodiment, the scan is performed by scanning a different subset of sensor elements, such as all the rows, alternating rows, or all the columns. In one embodiment, the sensor elements scanned at block 706 may be orthogonal or complementary to the subset of sensor elements scanned at block 702. For example, if column elements are scanned at block 702, then row elements may be scanned at block 706. From block 706, the process 700 continues at block 708.

At block 708, the controller 330 identifies an active subset of row sensor elements based on the row at which the contact was last detected. For example, the row at which the contact was last detected may have been scanned in accordance with block 702 or 706. Based on the last known row location of the contact, the controller 330 may determine a subset of active sensor elements. In one embodiment, sensor elements adjacent to the row at which the contact was last detected are selected as active sensor elements. Alternatively, the active sensor elements may be sensor elements that intersect other sensor elements within a threshold distance from the last known contact location. In yet another embodiment, the active sensor elements are the sensor elements most likely to be affected by future movement of the contact. From block 708, the process 700 continues at block 710.

At block 710, the controller 330 identifies an active subset of column sensor elements based on the column at which the contact was last detected. In one embodiment, sensor elements adjacent to the column at which the contact was last detected are selected as active sensor elements. Alternatively, the active sensor elements may be sensor elements that intersect other sensor elements within a threshold distance from the last known contact location. In yet another embodiment, the active sensor elements are the sensor elements most likely to be affected by future movement of the contact. From block 710, the process 700 continues at block 712.

At block 712, the controller 330 scans the subset of active sensor elements to determine an updated location of the contact. In one embodiment, the scan is a mutual capacitance scan of each intersection between sensor elements in the active subset of sensor elements. From block 712, the process 700 continues at block 716.

At block 716, the controller determines whether a contact is still present at the touch-sensing surface. If a contact is still present at the touch-sensing surface, the process 700 continues back to block 708, such that the controller 330 remains in tracking mode. If, at block 716, contact is lost, the process 700 continues back to block 712, such that the controller 330 transitions back to search mode.

For a system capable of detecting, locating, and tracking multiple contacts, each of a number of contacts at the touch-sensing surface may be associated with an active subset of row and column elements, which may be scanned to track the location of the contact.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
performing a first scan of a first set of electrodes of a touch-sensing surface, wherein the first set of electrodes comprises only row electrodes or only column electrodes of the touch-sensing surface, wherein performing the first scan comprises measuring a self capacitance for each electrode in the first set of electrodes;
determining a presence of at least one conductive object proximate to the touch-sensing surface based on the first scan;
repeating the performing the first scan until the at least one conductive object is proximate to the touch-sensing surface;
when the at least one conductive object is proximate to the touch-sensing surface based on the first scan, performing a second scan of a second set of electrodes of the touch-sensing surface, wherein the second set of electrodes comprises the other one of only the column electrodes or only the row electrodes of the touch-sensing surface, wherein performing the second scan comprises measuring a self capacitance for each electrode in the second set of electrodes;
in response to determining the presence of the at least one conductive object, performing a third scan of a third set of electrodes of the touch-sensing surface, wherein performing the third scan comprises measuring a mutual capacitance between at least one pair of electrodes of the third set of electrodes; and
repeating the performing the third scan without repeating the performing the first scan and the second scan until the at least one conductive object is no longer proximate to the touch-sensing surface.

2. The method of claim 1, wherein measuring the self capacitance for each electrode in the first set of electrodes comprises:
for each electrode in the first set,
charging the respective electrode with a capacitance sensor; and
discharging the respective electrode with the capacitance sensor, wherein the determining the presence comprises detecting a change in a rate of charge of the respective electrode when the presence of the at least one conductive object is proximate to the touch-sensing surface.

3. The method of claim 1, wherein the third set of electrodes comprises all the row electrodes and all the column electrodes.

4. The method of claim 1, further comprising determining a possible location of the at least one conductive object based on the first scan and the second scan, and wherein the third scan is a resolve scan to identify an actual location of the at least one conductive object.

5. The method of claim 1, further comprising determining a possible location of the at least one conductive object based on the first scan and the second scan, and wherein the third set of electrodes comprises electrodes adjacent to the possible location of the at least one conductive object at the touch-sensing surface.

6. The method of claim 1, further comprising determining a possible location of the at least one conductive object based on the first scan and the second scan, and wherein each of the electrodes of the third set of electrodes intersects another electrode within a threshold distance from the possible location of the at least one conductive object at the touch-sensing surface.

7. The method of claim 1, wherein performing the first scan comprises measuring the self capacitance of the first set of electrodes at a single sense channel.

8. The method of claim 1, wherein the first set of electrodes comprises at least one measured electrode and a plurality of non-measured electrodes, and wherein performing the first scan comprises driving each of the non-measured electrodes with a shield drive signal.

9. The method of claim 1, wherein the first set of electrodes is divided into a plurality of zones, wherein each of the plurality of zones comprises a subset of electrodes from the first set of electrodes, and wherein performing first scan comprises scanning each of the plurality of zones according to a predetermined sequence.

10. The method of claim 9, wherein electrodes of a first zone of the plurality of zones are interleaved with electrodes of a second zone of the plurality of zones.

11. The method of claim 1, wherein at least one electrode of the first set of electrodes is included in the second set of electrodes.

12. A touch sensor controller comprising:
processing logic circuitry;
a plurality of inputs configured to couple the processing logic circuitry with each of a plurality of electrodes of a touch-sensing surface; and
a capacitance sensor coupled with the plurality of inputs, wherein the capacitance sensor is configured to:
perform a first scan of a first set of the plurality electrodes of the touch-sensing surface to determine a presence of at least one conductive object proximate to the touch-sensing surface, the first set comprising only row electrodes or only column electrodes of the touch-sensing surface, the first scan being a self-capacitance scan,
repeat the first scan until the at least one conductive object is proximate to the touch-sensing surface,
when the at least one when the at least one conductive object is proximate to the touch-sensing surface based on the first scan, perform a second scan of a second set of the plurality of electrodes, the second set of electrodes comprising the other one of only the column electrodes or only the row electrodes of the touch-sensing surface, and the second scan being a self-capacitance scan,
in response to determining the presence of the at least one conductive object, perform a third scan of a third set of the plurality of electrodes of the touch-sensing surface, and
repeat the third scan without repeating the first scan and the second scan until the at least one conductive object is no longer proximate to the touch-sensing surface.

13. The touch sensor controller of claim 12, wherein the first set of electrodes and the second set of electrodes comprise all the row electrodes and all the column electrodes and the third set comprises less than all the row electrodes and less than all the column electrodes.

14. The touch sensor controller of claim 12, wherein the capacitance sensor comprises an amplifier coupled to a voltage reference and a respective one of the first set of the plurality of electrodes during the first scan, wherein the capacitance sensor is configured to charge and discharge the respective one of the first set of the plurality of electrodes during a plurality of charge and discharge cycles, and wherein the capacitance sensor is configured to detect a change in a rate of charge of the respective one of the first set of the plurality of electrodes when the presence of the at least one conductive object is proximate to the touch-sensing surface.

15. A touch-sensor controller comprising:
a plurality of inputs configured to couple with each of a plurality of electrodes of a touch-sensing surface; and
a capacitance sensor coupled with the plurality of inputs, wherein the capacitance sensor is configured to perform a first self-capacitance scan of a first set of the plurality of electrodes to detect a presence of a conductive object proximate to the touch-sensing surface, wherein the first set comprises only row electrodes or only column electrodes of the plurality of electrodes, wherein the capacitance sensor is further configured to repeat the first self-capacitance scan until the presence of the conductive object is proximate to the touch-sensing surface, wherein the capacitance sensor is further configured to perform a second self-capacitance scan of a second set of the plurality of electrodes to determine a possible location of the conductive object when the presence of the conductive object is proximate to the touch-sensing surface based on the first scan, wherein the second set comprises the other one of only the column electrodes or only the row electrodes of the touch-sensing surface, wherein the capacitance sensor is further configured to perform a mutual capacitance scan between at least one pair of the plurality of electrodes to determine an actual position of the conductive object proximate to the touch-sensing surface, and wherein the capacitance sensor is further configured to repeat the mutual capacitance scan without repeating the first self-capacitance scan and the second self-capacitance scan until the conductive object is no longer proximate to the touch-sensing surface.

16. The touch-sensor controller of claim 15, wherein the capacitance sensor is further configured to identify a plurality of possible locations of one or more conductive objects based on the first self-capacitance scan and the second self-capacitance scan and to identify at least one of a plurality of possible locations as an actual location of the one or more conductive objects based on the mutual capacitance scan.

17. The touch-sensor controller of claim 15, wherein the capacitance sensor is further configured to perform the mutual capacitance scan on electrodes adjacent to the possible location of the conductive object at the touch-sensing surface based on the first self-capacitance scan and the second self-capacitance scan.

18. The touch-sensor controller of claim 15, wherein the capacitance sensor comprises an amplifier coupled to a voltage reference and a respective one of the first set of the plurality of electrodes during the first self-capacitance scan, wherein the capacitance sensor is configured to charge and discharge the respective one of the plurality of electrodes during a plurality of charge and discharge cycles, and wherein the capacitance sensor is configured to detect a change in a rate of charge of the respective one of the plurality of electrodes when the presence of the at least one conductive object is proximate to the touch-sensing surface.

* * * * *